United States Patent [19]

Kikuchi

[11] Patent Number: 4,541,072
[45] Date of Patent: Sep. 10, 1985

[54] MAGNETIC BUBBLE DISPLAY DEVICE
[75] Inventor: Yoshiki Kikuchi, Kanagawa, Japan
[73] Assignee: Fuji Xerox Co., Ltd., Tokyo, Japan
[21] Appl. No.: 337,552
[22] Filed: Jan. 6, 1982
[30] Foreign Application Priority Data Jan. 12, 1981 [JP] Japan .................................. 56-2120

[51] Int. Cl.³ .............................................. G11C 19/08
[52] U.S. Cl. .......................................... 365/29; 365/1
[58] Field of Search ................... 365/11, 19, 20, 21, 365/29, 3, 1; 340/787, 788

[56] References Cited
U.S. PATENT DOCUMENTS

Re. 29,535  2/1978  Chen et al. ............................ 365/19
4,151,599   4/1979  Kikuchi ................................. 365/29
4,360,899  11/1982  Dimyan et al. ......................... 365/2

FOREIGN PATENT DOCUMENTS

0026536  3/1978  Japan ..................................... 365/1
0830564  5/1981  U.S.S.R. ............................... 365/27

Primary Examiner—James W. Moffitt
Attorney, Agent, or Firm—Sughrue, Mion, Zinn, Macpeak, and Seas

[57] ABSTRACT

The orthogonal conductors in a magnetic bubble display device each extend in only one direction across the magnetic medium and carry current in only one direction. Sector shaped recesses are formed between conductors for holding the bubbles.

9 Claims, 15 Drawing Figures

MAGNETIC BUBBLE DISPLAY DEVICE

BACKGROUND OF THE INVENTION

This invention relates to display devices using magnetic bubbles, and more particularly to a magnetic bubble display device in which, after a bubble grid is formed, the magnetic bubbles in the bubble grid are selectively caused to vanish to display characters, figures or the like.

Figure 1:
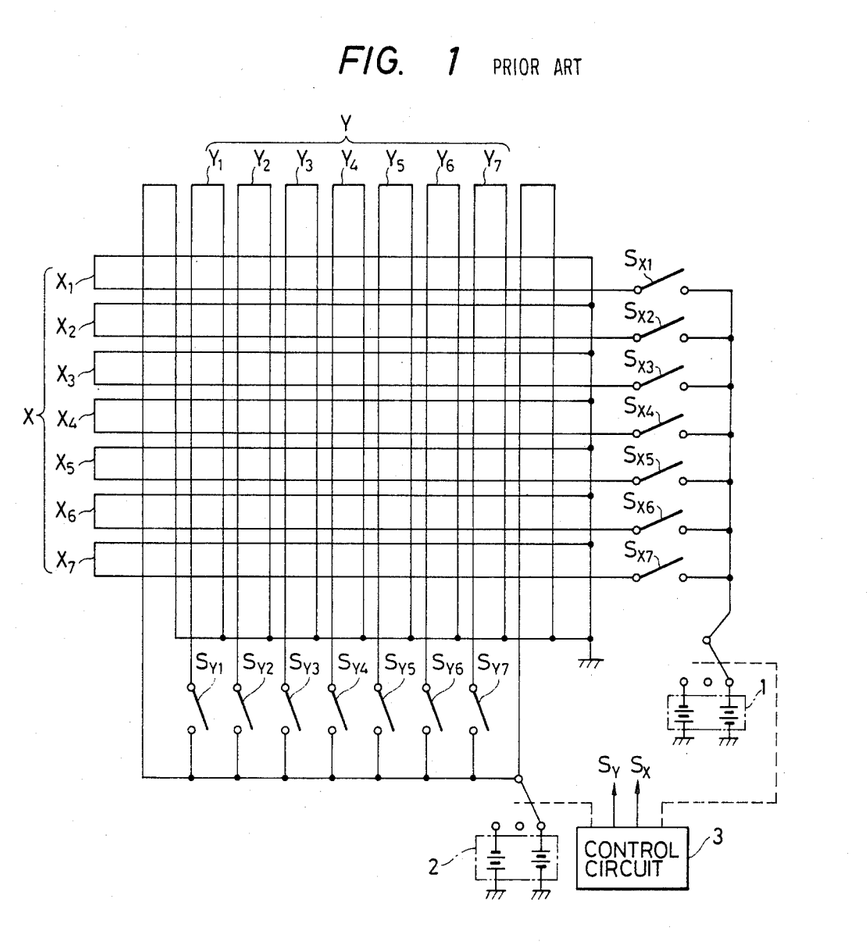
FIG. 1 is an explanatory diagram showing the arrangement of a conventional magnetic bubble display device.

FIG. 1 shows a conventional magnetic bubble display device. The device has a film made of magnetic bubble material such as rare earth orthoferrite (hereinafter referred to as "a magnetic film"), a conductor wire pattern X consisting of a number of conductor wires $S_1$ through $X_7$ each of which is folded in parallel to have a "go" wire and a "return" wire; and a conductor wire pattern Y consisting of a number of conductor wires $Y_1$ through $Y_7$ which are folded similarly as in the case of the conductor wire pattern X and laid preferably but not necessarily perpendicularly across the conductor wires $X_1$ through $X_7$. First ends of the conductor wires $X_1$ through $X_7$ are connected through respective switches $S_{x1}$ through $S_{x7}$ to an electric source 1. Similarly, first ends of the conductor wires $Y_1$ through $Y_7$ are connected through respective switches $S_{y1}$ through $S_{y7}$ to an electric source 2. A control circuit 3 controls these switches $S_{x1}$ through $S_{x7}$, and $S_{y1}$ through $S_{y7}$.

In the conventional device thus organized, currents flowing in the conductor wire patterns X and Y are controlled, to thereby change the strengths of magnetic fields which are created between the conductor wires, whereby magnetic bubbles are generated or caused to vanish individually, to display a desired character or figure. However, the conventional device is disadvantageous in that it is, as a whole, intricate in construction because each conductor wire consists of a "go" wire and a "return" wire. In addition, the conventional device suffers from a drawback that, when it is necessary to increase the number of magnetic bubbles in a line or column direction, since each conductor wire consists of "go" and "return" wires, the length of a conductor wire is increased by twice as long as the distance between picture elements, as a result of which the percentage of resistance increase per picture element is doubled. Furthermore, the direction of current for formation of a bubble grid is opposite to the direction of current for causing magnetic bubbles to vanish. Therefore, different drive transistors must be provided for different current directions. Thus, the number of transistors per line or column is also doubled.

SUMMARY OF THE INVENTION

In view of the foregoing, an object of this invention is to minimize the increment of the percentage of resistance increase and the increment of the number of drive transistors which are required as the number of lines or columns in a bubble grid is increased.

The foregoing object has been achieved according to the invention by a device in which each conductor wire is a single wire which is not folded, and a control circuit controls currents flowing in the conductor wires, to thereby selectively cause magnetic bubbles, which are generated in the form of a grid, to vanish. The invention preferably comprises first and second orthogonal sets of parallel conductors each of which conducts current in one direction only, and sector-shaped recess patterns formed between intersecting wires for holding individual bubbles.

BRIEF DESCRIPTION OF THE INVENTION

This invention will be described with reference to the accompanying drawings, in which.

DETAILED DESCRIPTION OF THE INVENTION

Figure 2:
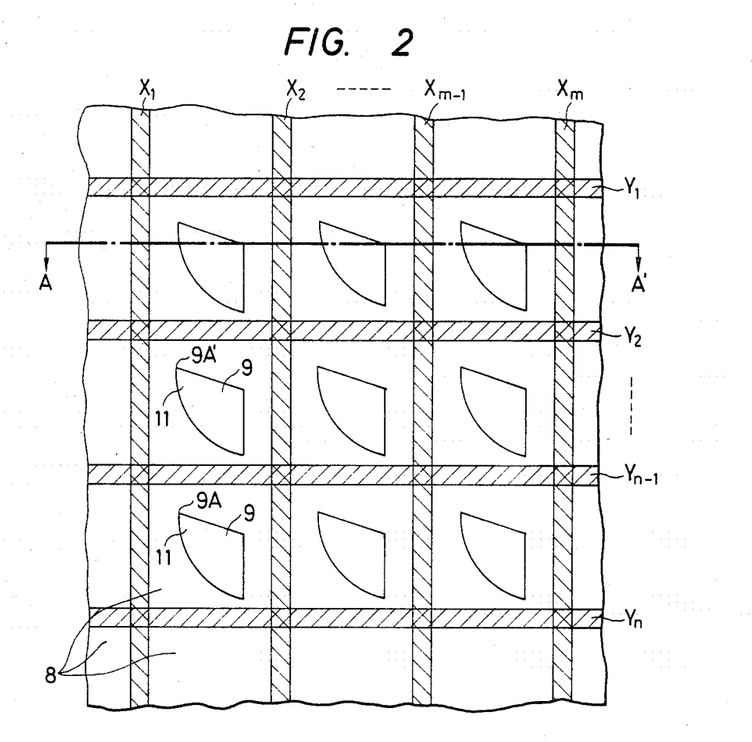
FIG. 2 is a plan view showing a part of a magnetic bubble display device according to the invention.
Figure 3:
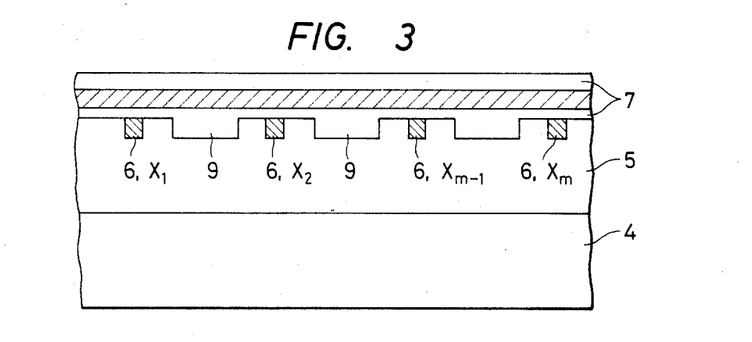
FIG. 3 is a sectional view taken along line A—A' in FIG. 2.

FIG. 2 is a plan view showing the structure of a magnetic bubble display device according to the invention, and FIG. 3 is a sectional view taken along line A-A' in FIG. 2. In the display device, conductor wires $X_1$ through $X_m$ (m being an integer), each being a single wire which is not folded, are buried in grooves 6 in a magnetic film 5 which is formed on a substrate 4. An insulating layer 7 is formed on the magnetic film 5. Conductor wires $Y_1$ through $Y_n$ (n being an integer), each being a single wire which is not folded, are buried in the insulating layer 7 in such a manner that they are in parallel with each other and are spaced by a predetermined distance from the conductor wires $X_1$ through $X_m$.

In inter-groove regions 8 defined by the conductor wires $X_1$ through $X_m$, the upper surface of the magnetic film 5 is recessed to a predetermined depth to form a plurality of sector-shaped recess patterns 9. The inter-groove regions 8 serve as stretching paths along which seed bubbles stretch into strip domains. Each recess pattern 9 has a corner 9A where an arc and the radius thereof meet each other. The recess patterns 9 are arranged on lines so that the corners 9A are directed towards the intersections of the conductor wires $X_1$ through $X_m$ and $Y_1$ through $Y_n$. After the strip domain is cut, the vicinity of the corner 9A becomes a grid point 11 of a bubble grid.

FIGS. 4 through 7 are diagrams for explaining the steps of growth of the bubble grid in the magnetic bubble display device thus arranged. In the device shown in FIGS. 4 through 7, conductor wires $X_1$ through $X_6$ and conductor wires $Y_1$ through $Y_8$ are arranged on a magnetic film in the same manner as shown in FIG. 3. First ends of the conductor wires $X_1$ through $X_6$ and $Y_1$ through $Y_8$ are grounded, the other ends are connected through switches $S_{x1}$ through $S_{x6}$ and switches $S_{y1}$ through $S_{y8}$ to DC sources 12 and 13, respectively.

Figure 4:
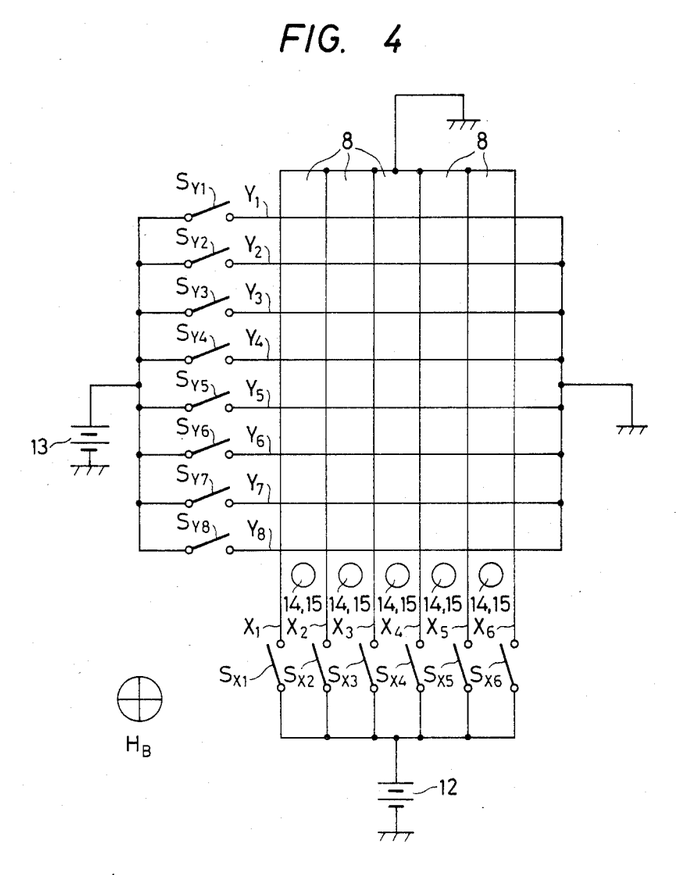
FIG. 4 is a schematic diagram showing the arrangement of the magnetic bubble display device in which seed bubbles are set at seed bubble positions.

In the initial step shown in FIG. 4, a bias magnetic field $H_B$ is applied perpendicularly to the surface of the magnetic film. In this case, seed bubbles 14 are set at seed bubble positions 15 as shown in FIG. 4. The seed bubbles 14 are generated and set according to a conventional method in which magnetic bubbles are generated by a bubble generator and are transferred to seed bubble positions.

Figure 5:
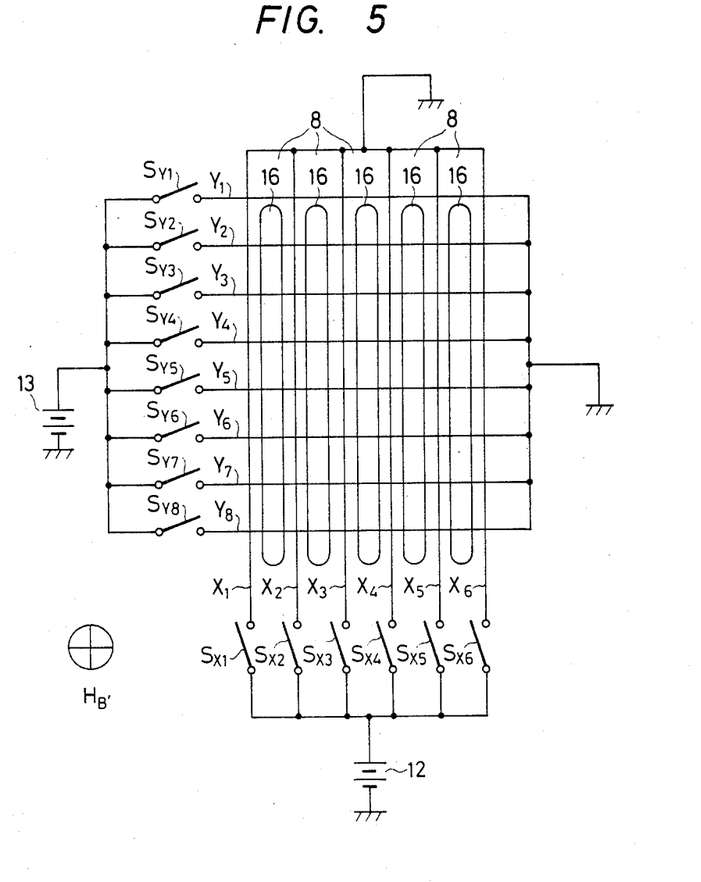
FIG. 5 is a schematic diagram showing the arrangement of the magnetic bubble display device in which an array of strip domains is formed.

Under this condition, the bias magnetic field $H_B$ is suitably decreased into a bias magnetic field $H_{B'}$. As a result, as shown in FIG. 5 indicating the second step, the seed bubbles are stretched out by using the intergroove regions 8 as channels, thus forming an array of strip domains 16. The reason why the strip domain is formed along the intergroove region 8 is that, in the case where a magnetic film has a recess, e.g. grooves 6 into which the conductors are set as shown in FIG. 3, the recess exerts a repulsive force on a magnetic domain which approaches the recess.

Figure 6:
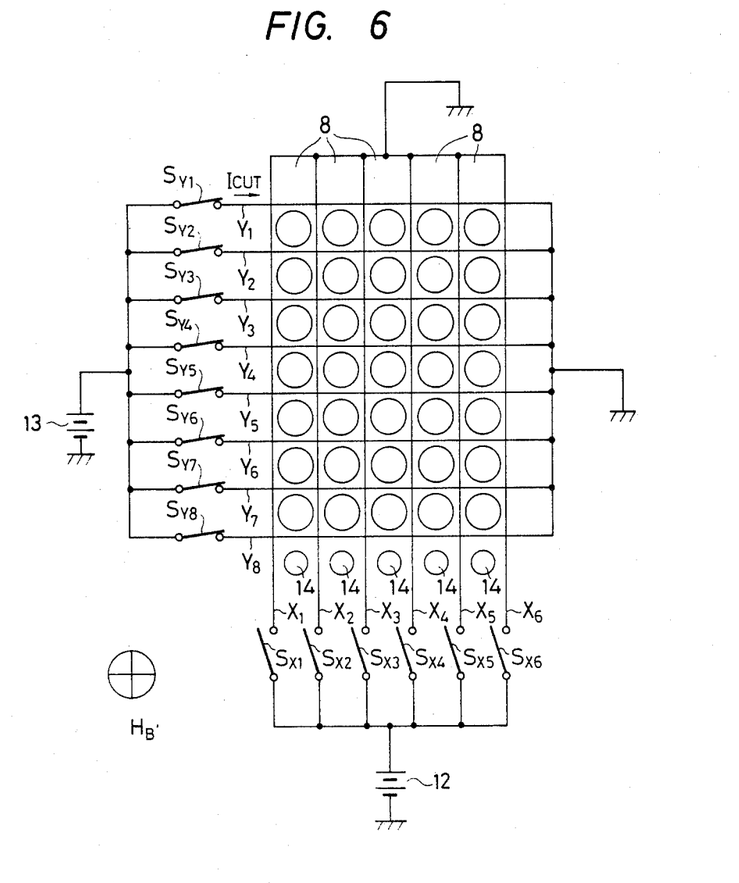
FIG. 6 is a schematic diagram showing the arrangement of the magnetic bubble display device in which the strip domains have been cut.

Under this condition, as shown in FIG. 6 indicating the third step, the switches $S_{y1}$ through $S_{y8}$ are closed to apply currents $I_{CUT}$ to the conductor wires $Y_1$ through $Y_8$. As the conductor wires $Y_1$ through $Y_8$ are orthogonal with the strip domains, the strip domains are cut by the magnetic fields which are created by the currents $I_{CUT}$ along the bias magnetic field.

Figure 7:
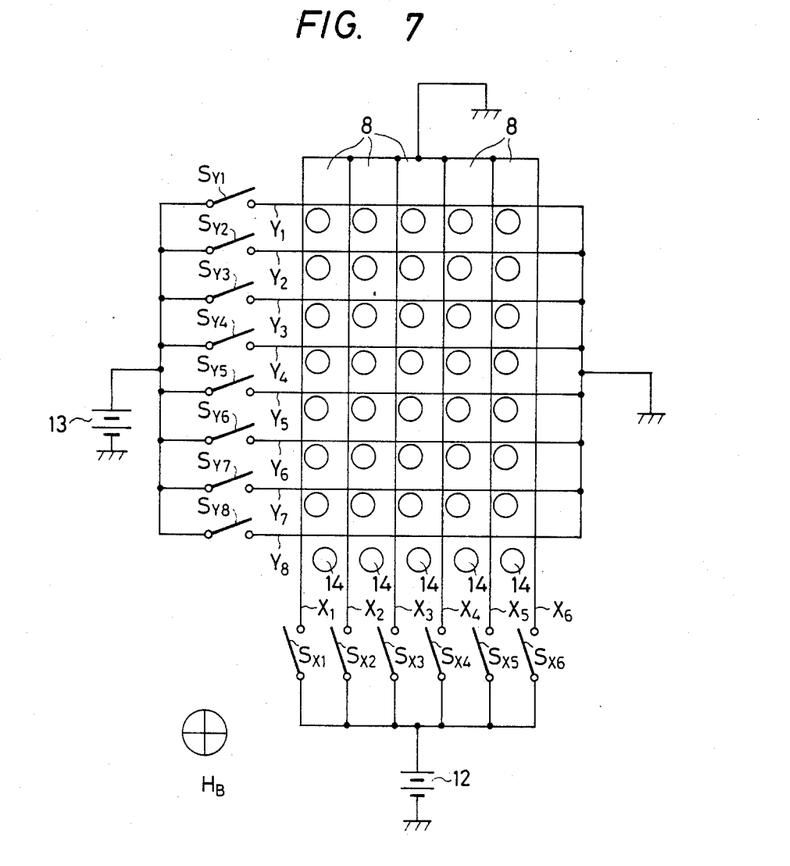
FIG. 7 is a schematic diagram showing the arrangement of the magnetic bubble display device in which a bubble grid has been formed.

Thereafter, the switches $S_{y1}$ through $S_{y8}$ are opened to interrupt the application of the currents $I_{CUT}$, and then the bias magnetic field $H_{B'}$ is restored to the original bias magnetic field $H_B$. As a result, a bubble grid is formed as shown in FIG. 7 indicating the final step. Each of the bubbles in the bubble grid is consistently located at the grid point of each sector-shaped recess pattern.

Figure 8A:
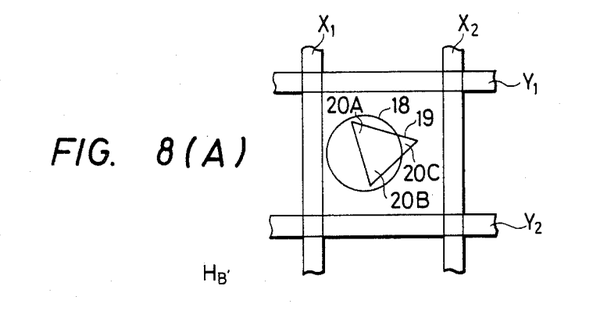
FIG. 8(A) is an explanatory diagram showing a state of a magnetic bubble which is provided immediately after the strip domain is cut with a triangular recess pattern used.
Figure 8B:
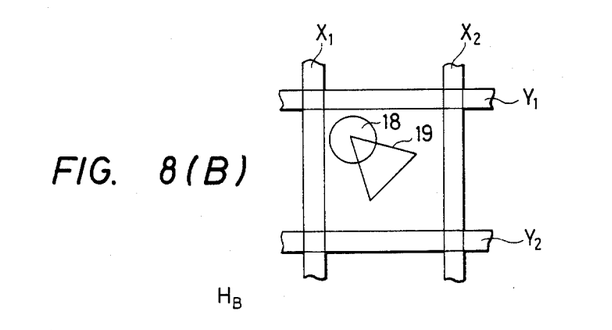
FIGS. 8(B) and 8(C) are explanatory diagrams showing states of magnetic bubbles which are moved to respective stable points with the pattern used.
Figure 8C:
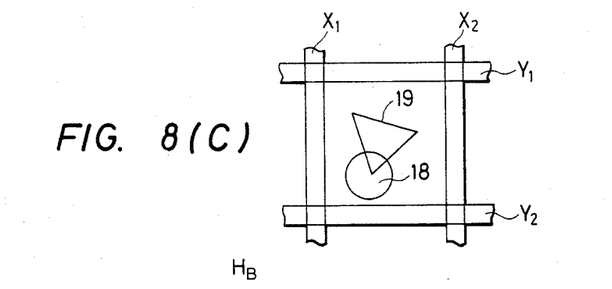

In this embodiment, the recess pattern is in the form of a sector. The reason why the recess pattern should not be in the form of a triangle will be described with reference to FIG. 8. FIG. 8(A) shows a magnetic bubble 18 which is obtained immediately after the strip domain is cut. In the case of a triangular recess pattern 19, a magnetic bubble can exist stably at each of the three corners 20A, 20B and 20C of the recess pattern 19. Therefore, when the bias magnetic field $H_{B'}$ is increased to the original bias magnetic field $H_B$, the diameter of the magnetic bubble 18 is decreased, while the magnetic bubble 18 is moved to a position as shown in FIG. 8(B) or (C). As a result, in the formed bubble grid, the grid points are irregular in position. Even if current is applied to the conductor wires to cause the magnetic bubbles 18 to vanish under the condition that the grid points are irregularly positioned, a problem may occur that the magnetic bubble in FIG. 8(A) vanishes while the magnetic bubble in FIG. 8(C) does not vanish, because the magnetic fields applied to the magnetic bubbles are different from one another. With the sector-shape of this embodiment, such a difficulty never arises, because the magnetic bubble is stably set at only one position of the recess pattern.

Figure 9A:
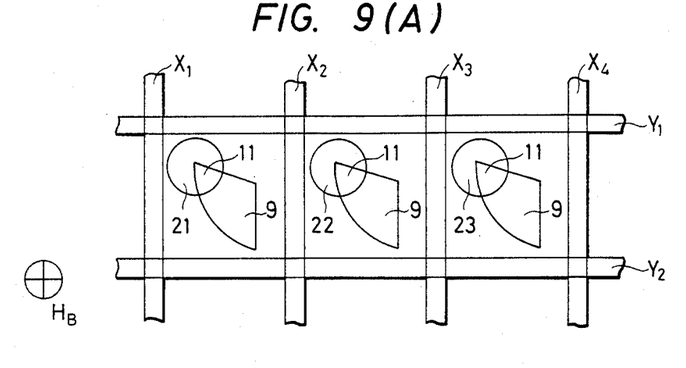
FIGS. 9(A) through 9(B) are explanatory diagrams showing the steps in a process of selectively causing magnetic bubbles to vanish according to image data.
Figure 9B:
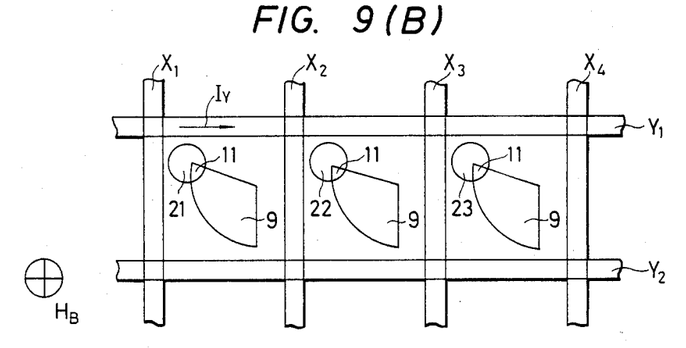

Now, a process of selectively causing the magnetic bubbles to vanish according to image data in the magnetic bubble display device in which the bubble grid has been formed, will be described with reference to FIG. 9. FIG. 9(A) corresponds to FIG. 7, wherein magnetic bubbles 21, 22 and 23 are set at the grid points of respective recess patterns 9. In the case where the magnetic bubbles arranged horizontally along the conductor wire $Y_1$ are selectively caused to vanish, a control circuit (not shown) allows a current $I_y$ to flow in the conductor wire $Y_1$ in the direction of the arrow (FIG. 9(B)), so that a magnetic field $H_y$ is created along the bias magnetic field and the diameters of the magnetic bubbles are decreased. Since it is important that the current $I_y$ alone not be enough to erase all bubbles along the conductor $Y_1$, the current $I_y$ is so controlled that the magnetic field $H_y$ created thereby meets the following expression (1):

$$H_B + H_Y < H_{co} \qquad (1)$$

where $H_{co}$ is the bubble vanishing magnetic field whose strength is such that a magnetic bubble 18 at the grid point 11 vanishes.

Figure 9C:
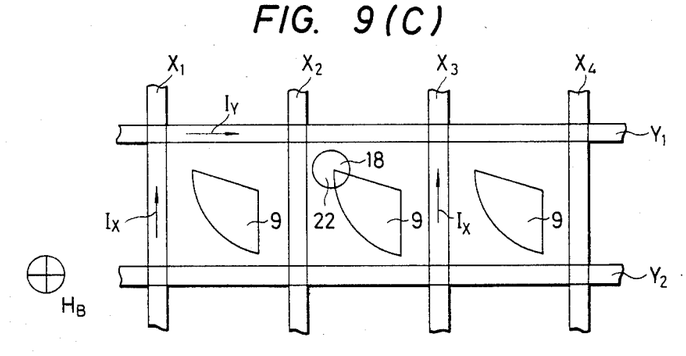

It is assumed that the two magnetic bubbles 21 and 23 set near the intersections of the conductor wire $Y_1$ with the conductor wires $X_1$ and $X_3$ should be caused to vanish according to an image signal. In this case, as shown in FIG. 9(C), currents $I_X$ are caused to flow in the conductor wires $X_1$ and $X_3$ in the direction of the arrow under the condition that the current $I_Y$ flows in the conductor wire $Y_1$. No current is applied to the conductor wire $X_2$. The current $I_X$ is so controlled that a magnetic field $H_X$ created thereby along the bias magnetic field $H_B$ meets the following expression (2):

$$H_{co} \leq H_B + H_Y + H_X \qquad (2)$$

As a result, magnetic fields stronger than the bubble vanishing magnetic field $H_{co}$ are applied to the bubbles 21 and 23, so that the latter 21 and 23 vanish. However, the magnetic bubble 22 does not vanish because the magnetic field applied thereto is subject to the conditions of the expression (1).

Figure 9D:
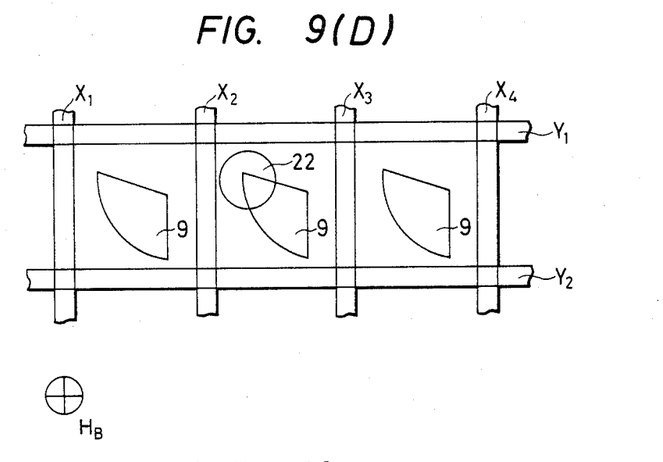

When the application of the currents $I_X$ and $I_Y$ is suspended after the magnetic bubbles have been selectively caused to vanish, the diameter of the magnetic bubble 22 is restored as shown in FIG. 9(D). The upper limit of the current $I_X$ which is applied to the conductor wires $X_1$ through $X_4$ according to an image signal is determined to meet the following expression:

$$H_B + H_X < H_{co}$$

This is necessary since, if the current $I_X$ is made larger than the upper limit value, then magnetic bubbles other than the intendend one or ones will be caused to vanish.

The above-described process of selectively causing magnetic bubbles to vanish is applied to the conductor wires $Y_2$ through $Y_7$ successively, so that a bubble pattern is provided according the image data.

Figure 10:
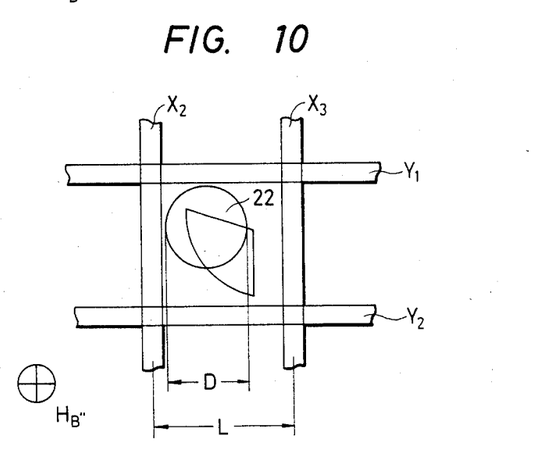
FIG. 10 is an explanatory diagram showing the case where the diameter of a magnetic bubble is enlarged for display.

In order to display the bubble pattern thus provided, the bubble pattern is projected onto display means such as a screen by utilizing a magnetooptical effect (Faraday effect). If, during the display, a bias magnetic field $H_{B''}$ weaker than the original bias magnetic field $H_B$ is applied to the magnetic bubble display device, the diameter of the magnetic bubble 22 will be increased as shown in FIG. 10, and accordingly a ratio (D/L) of the diameter D of a magnetic bubble to the distance L between bubbles is increased. Therefore, the difference in brightness between a picture element which has a magnetic bubble and an element which has no magnetic bubble is increased, whereby a clear display can be obtained. In this case, the enlarged magnetic bubble is stable at the grid point.

As is clear from the above description, according to this invention, each conductor segment is made of a single wire which is not folded. Therefore, the conductor segment pattern is simple, the area of the opaque region is decreased, and the device can be easily manufactured. Since the magnetic bubbles can be stably enlarged, the invention is advantageous in that the limitation in enlarging magnetic bubbles is released.

In the above-described embodiment, an image signal is applied to the side of the conductor wires X; however, it goes without saying that the image signal may be applied instead to the side of the conductor wires Y. Furthermore, in this embodiment, the recess pattern is in the form of a sector; however, the invention is not limited thereto or thereby. That is, it goes without saying that other configurations may be utilized if they provide the same effect. Furthermore, in this embodiment, the conductor wires $X_1$ through $X_m$ are buried in the grooves provided in the magnetic film; however, the same effect can be obtained by arranging the conductor wires to be adjacent to the grooves.

In the embodiment, the seed bubbles are stretched along the channels (between the grooves) into strip domains by decreasing the bias magnetic field; however, the seed bubble array can be changed into the strip domain array by successively or simultaneously applying the currents to the conductor wires $X_1$ through $X_m$ with the bias magnetic field maintained unchanged. Therefore, the provision of the grooves is not always required.

What is claimed is:

1. A magnetic bubble display device, comprising: a magnetic film; means for applying a bias magnetic field to said magnetic film; a first set of conductors parallel to one another; a second set of conductors parallel to one another and extending across said first set of conductors to form a matrix of bubble areas each defined by the intersection of a consecutive pair of first conductors with a consecutive pair of second conductors, said first and second sets of conductors being electrically isolated from one another and magnetically coupled to said film; means for applying a first current simultaneously to a plurality of said first conductors flowing in only one direction across said film to cut off an elongate bubble domain extending between a consecutive pair of said second conductors, to thereby form a plurality of magnetic bubbles each confined to a respective bubble area; and control means for thereafter selectively applying said first current to a first conductor and for simultaneously applying a second current to a second conductor, said first and second currents each flowing in only first and second respective directions across said magnetic film to generate first and second magnetic fields, respectively, combining with said bias field to erase a selected one of said plurality of magnetic bubbles.

2. The magnetic bubble display device as claimed in claim 1, wherein said magnetic medium includes recesses formed therein in each bubble area.

3. The magnetic bubble display device as claimed in claim 2, wherein said recesses are sector shaped.

4. The magnetic bubble display service as claimed in claim 1, further comprising grooves (6) formed in said magnetic film and running parallel to said first conductors.

5. The magnetic bubble display device as claimed in claim 4, wherein said first conductors are buried in said grooves.

6. The magnetic bubble display device as claimed in claim 1, wherein said first current generates a magnetic field $H_X$ in said magnetic film such that $H_B + H_X < H_{co}$, where $H_B$ is a bias magnetic field, $H_X$ is said magnetic field generated in said magnetic film by said first current and $H_{co}$ is a magnetic field level in said magnetic film at which magnetic bubbles will be erased.

7. The magnetic bubble display device as claimed in claim 6, wherein said second current generates a magnetic field $H_Y$ in said magnetic film such that $H_B + H_Y < H_{co}$ and $H_B + H_X + H_Y \leq H_{cp}$.

8. A magnetic bubble display device, comprising: a magnetic film; means for applying a bias magnetic field to said magnetic film; a first set of conductors parallel to one another; a second set of conductors parallel to one another and extending across said first set of conductors to form a matrix of bubble areas each defined by the intersection of a consecutive pair of first conductors with a consecutive pair of second conductors, said first and second sets of conductors being electrically isolated from one another and magnetically coupled to said film, said film including grooves formed therein on either side of each said bubble area and extending substantially parallel to said first conductors; means for applying a first current simultaneously to a plurality of said first conductors to cut off an elongate bubble domain extending between a consecutive pair of said second conductors, to thereby form a plurality of magnetic bubbles each confined to a respective bubble area; and means for thereafter selectively applying said first current to one of said plurality of first conductors and for simultaneously applying a second current to a second conductor, said first and second currents each flowing in only first and second respective directions across said magnetic film to generate first and second magnetic fields, respectively, combining with said bias field to erase a selected one of said plurality of magnetic bubbles.

9. A magnetic bubble display device, comprising: a magnetic film; means for applying a bias magnetic field to said magnetic film; a first set of conductors parallel to one another; a second set of conductors parallel to one another and extending across said first set of conductors to form a matrix of bubble areas each defined by the intersection of a consecutive pair of first conductors with a consecutive pair of second conductors, said first and second sets of conductors being electrically isolated from one another and magnetically coupled to said film, said magnetic film having a sector-shaped recess formed in each bubble area; and control means for applying currents to selected ones of said first and second conductors to generate or eliminate magnetic bubbles in said medium in accordance with image data, said first and second currents each flowing in only first and second respective directions across said magnetic film to generate first and second magnetic fields, respectively, combining with said bias field to erase a selected one of said plurality of magnetic bubbles.

* * * * *